US010110851B2

(12) United States Patent
Alrod et al.

(10) Patent No.: US 10,110,851 B2
(45) Date of Patent: Oct. 23, 2018

(54) SYSTEM AND METHOD FOR DYNAMIC LIGHT ADJUSTMENT IN VIDEO CAPTURE

(71) Applicant: Avaya Inc., Santa Clara, CA (US)

(72) Inventors: Amir Alrod, Tel Aviv (IL); Tamar Barzuza, Tel Aviv (IL)

(73) Assignee: Avaya Inc., Santa Clara, CA (US)

( * ) Notice: Subject to any disclaimer, the term of this patent is extended or adjusted under 35 U.S.C. 154(b) by 0 days.

(21) Appl. No.: 15/148,588

(22) Filed: May 6, 2016

(65) Prior Publication Data
US 2017/0324933 A1 Nov. 9, 2017

(51) Int. Cl.
H04N 7/15 (2006.01)
G06K 9/00 (2006.01)
H05B 37/02 (2006.01)

(52) U.S. Cl.
CPC ........... *H04N 7/15* (2013.01); *G06K 9/00744* (2013.01); *H05B 37/029* (2013.01)

(58) Field of Classification Search
None
See application file for complete search history.

(56) References Cited

U.S. PATENT DOCUMENTS

| 9,124,795 | B2* | 9/2015 | Coyle-Gilchrist | H04N 5/232 |
|---|---|---|---|---|
| 9,384,384 | B1* | 7/2016 | Tyagi | G06T 11/00 |
| 2004/0017930 | A1* | 1/2004 | Kim | G06K 9/00228 |
| | | | | 382/103 |
| 2005/0177463 | A1* | 8/2005 | Crutchfield, Jr. | G06Q 30/06 |
| | | | | 705/26.9 |
| 2011/0106736 | A1* | 5/2011 | Aharonson | G06Q 10/109 |
| | | | | 706/12 |
| 2012/0293605 | A1* | 11/2012 | Seferian | H04N 7/147 |
| | | | | 348/14.08 |
| 2012/0300011 | A1* | 11/2012 | Moletti | H05B 37/0227 |
| | | | | 348/14.01 |
| 2013/0091548 | A1* | 4/2013 | Song | H04W 12/04 |
| | | | | 726/4 |
| 2013/0155474 | A1* | 6/2013 | Roach | G06Q 20/322 |
| | | | | 358/505 |
| 2015/0102745 | A1* | 4/2015 | Pijlman | H05B 37/0236 |
| | | | | 315/291 |
| 2016/0227381 | A1* | 8/2016 | Bargetzi | H04W 4/06 |
| 2016/0249439 | A1* | 8/2016 | Recker | H02J 9/02 |
| 2017/0214962 | A1* | 7/2017 | Ono | H04N 21/431 |

OTHER PUBLICATIONS

Sun et al., "Active lighting for video conferencing," IEEE, 2009, 9 pages.

* cited by examiner

*Primary Examiner* — Creighton Smith
(74) *Attorney, Agent, or Firm* — Sheridan Ross P.C.

(57) ABSTRACT

A video-enabled communication system includes a camera to acquire an image of a local participant during a video communication session and a control unit that selects a lighting configuration for the local participant to be captured by the camera for provision to a remote endpoint for display to another participant. The lighting configuration selection is based on information describing a local participant or context of the video communication session. The processor conditions a change from providing, to the remote participant endpoint for display, a first image captured under a first lighting configuration selected at a first time to a second image captured under a different lighting configuration selected at a second time upon a difference between the first and second times having at least a threshold magnitude.

39 Claims, 6 Drawing Sheets

SYSTEM AND METHOD FOR DYNAMIC LIGHT ADJUSTMENT IN VIDEO CAPTURE

FIELD

The disclosure relates generally to video communication and particularly to lighting control in video telecommunication.

BACKGROUND

Video conferencing solutions enable manual adjustment of Pan Tilt Zoom (PTZ) cameras via a remote control. Common practice is to adjust a camera manually with every meeting start to optimize the view for that specific meeting.

In two-camera solutions, it is common practice to have one camera still and transmitting video while the other camera is moving and searching for a next optimal point of view. When the next optimal point of view is identified, the system switches to that camera for video transmission and the other camera is moved to search for the next optimal point of view.

Studio level experience in video conferencing is often desired but rarely achieved. Expensive solutions that simulate a director cut are lacking an entire-room view. Once an active speaker is identified, the camera focuses on the participant and neglects any other participant in the room.

Both single- and two-camera video conferencing solutions, lighting is not controlled to facilitate user experience. The video conferencing solution receives as a fixed input both synthetic and natural lighting in the meeting area. For example, in high end meeting rooms there are many light bulbs controlled by several switches, often divided based on room geometry. Ambient light changes around the day. This can cause captured images of an active speaker to be poorly illuminated while nonspeaking meeting participants are well illuminated or meeting participants to be well illuminated while an object of interest in the meeting area, such as a whiteboard, is poorly illuminated. Accordingly, lighting can be important not only to meeting participants in the meeting area but also to meeting participants viewing the captured images during the video conference.

These omissions can lead to a poor user experience.

SUMMARY

These and other needs are addressed by the various embodiments and configurations of the present disclosure.

A video-enabled communication system can include:
a camera to acquire an image of a local participant during a video communication session; and
a control unit, coupled with the camera.

The control unit comprises a processor and a computer readable medium comprising a lighting controller that causes the processor to select a lighting configuration for the local participant(s) to be captured by the camera for provision to a remote endpoint for display to another participant. The lighting configuration selection can be based on information describing a local participant or context of the video communication session. The processor can condition a change from providing, to the remote participant endpoint for display, a first image captured under a first lighting configuration selected at a first time to a second image captured under a different lighting configuration selected at a second time upon a difference between the first and second times having at least a threshold magnitude.

The first image can be of a first set of objects (such as one or more participants or whiteboard), and the second image of a different second set of objects.

The lighting controller can cause the processor to create or update an electronic map of a meeting area comprising the local participant(s). The electronic map can include, for each lighting element, a corresponding one or more of set of coordinates relative to the selected point of reference, a wattage level of the lighting element, a type of the lighting element, a color of light output by the lighting element, an intensity variability of the lighting element, when the lighting element has variable intensity a percentage variation in intensity for different settings, a relationship of the lighting element to another lighting element, whether the lighting element is wirelessly controlled directly or indirectly by another lighting element, and an electronic address of the lighting element, and wherein the lighting controller selects each of plural lighting elements and, for each of the plural lighting elements, determines one or more of a color of output light, an intensity of output light, and a brightness of output light.

The first and second lighting configuration each comprise one or more of an activated light, a deactivated light, a brightness or intensity level, and a color spectrum.

The processor can control the lighting configuration based on the information describing a local participant or context of the video communication session.

The information can describe a local participant or context of the video communication session and comprise one or more of local participant location based upon detection of a face of the local participant, an identity of the local participant, or movement of the local participant from one location to another.

The information can describe a local participant or context of the video communication session and comprise one or more of use of a key word or phrase during the video communication session, an estimated meeting duration, or a meeting type or structure.

The context can be based on a determined point of local participant focus based on one or more image processing or meeting content analysis.

The information can be independent of active speaker detection or tracking.

A video-enabled communication system can include:
a processor coupled with a camera, wherein the processor causes the camera to acquire an image of a local participant in a meeting area during a video communication session; and
a computer readable medium comprising a lighting controller that causes the processor to discover one or more wirelessly controlled lighting elements in a meeting area and, by varying a state or setting of each of the discovered lighting elements, select a set of lighting conditions for the image to be captured by the camera for provision to a remote endpoint for display to another participant.

The lighting controller can determine, for the lighting element, one or more of a color of output light, an intensity of output light, and a brightness of output light.

The processor can select the set of lighting conditions by identifying one or more participant faces or facial features using face detection, varying lighting element property until one or more of the detected face images is approximately equal to a target mean color for the one or more participant faces or facial features.

The lighting element can have a wireless signaling interface.

The processor, using a first set of possible valid addresses on the network, can discover the lighting element by pinging each of the addresses in the first set of addresses, and, for each validated address, adding the valid address to a second set of valid addresses.

The processor can use, for each address in the second set of valid addresses, one or more traceroute packets to determine a connectedness of the selected address to one or more addresses. This can be done in a calibration stage once to build an electronic lighting map. In the calibration stage, the system, using known IP addresses, can create the lighting map.

The control unit can be used in a videoconferencing endpoint that is in a meeting room or classroom to capture an interactive meeting or lecture. The control unit can have knowledge or awareness of the meeting area spatial configuration and of the lights assigned to different meeting area spatial subareas. The control unit can create automatically a dynamic lighting experience by analyzing the meeting content and identifying the sources of attention, or focal points or points of interest, to selectively provide them with different illumination than other objects that are not of interest. For example, the control unit can turn on a spotlight on the object of interest, such as an active speaker in a business meeting or lecturer in a classroom setting) or whiteboard (such as during a whiteboard presentation), and dim the lights on other participants (such as nonspeaking business meeting participants or audience in a classroom). When there is a change in the point of focus, the control unit can turn on a spotlight on the new object of interest and dim the lights on the other objects. The control unit can vary the color and/or brightness of the lighting differently when the local participant is watching a lecture (e.g., more dimmed) or when brainstorming with other participants (e.g., brighter).

The above system and method can enable a videoconferencing system to auto-adjust the lighting to enhance remote and local user experience in many ways, including spotlighting areas of attention, such as an active speaker or whiteboard. Lighting can be controlled based on analytics and other inputs. By controlling lighting not only can the system avoid omitting part of the meeting area due to poor illumination but also the system can avoid having to change the camera view or switch from camera to camera. The system can illuminate only the important parts in the image to be captured, causing the viewer to focus only on them. The use of a time threshold and rules typically cause the processor to perform only a few adjustments throughout the entire meeting that will provide an optimal set of lighting conditions according to a predetermined definition or set of criteria. It can be relatively inexpensive compared to multi-camera solutions. It can allow the remote participants to view the entire room rather than only one participant at a time and the resulting experience can be satisfying for remote participants. Conventional systems, in contrast, use audio tracking and multiple cameras, causing fast and repetitive transitions between speakers and substantial participant distraction, particularly in large conference rooms. The system and method of this disclosure can use only one camera yet identify dynamically the optimal view of the room at specific points in time during the meeting and, using variations in lighting, provide a much better viewing experience for remote participants. Finally, the system and method can enhance not only the experience of remote participants but also of local participants. For example, during a presentation the system can dim the lights in the room and shed light only on screen.

The present disclosure can provide a number of other advantages depending on the particular configuration.

These and other advantages will be apparent from the disclosure contained herein.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "biometric information" is any information that can be used in biometric verification to identify uniquely a selected person, including one or more distinguishing biological traits. Unique identifiers include, for example, fingerprints, hand geometry, a facial feature such as earlobe geometry, retina and iris patterns, and the like, voice waves, DNA, and signatures. Facial recognition, for example, can be used to biometrically verify a selected person's identity.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "electronic address" refers to any contactable address, including a telephone number, instant message handle, e-mail address, Universal Resource Locator ("URL"), Universal Resource Identifier ("URI"), Address of Record ("AOR"), electronic alias in a database, like addresses, and combinations thereof.

The term "face detection" refers to an algorithm for detecting a face of a subject in a captured image by applying digital image processing techniques to image information (either still or video frame). Such algorithms include the Viola-Jones face detection algorithm (which uses Haar feature selection, integral image creation, Adaboost training, and cascading classifiers to effect face detection) and implementations thereof (such as the MATLAB and OpenCV implementations of the algorithm), KLT algorithm (which acquires numerous feature points by first scanning the face; these points then may be detected and tracked even when the face is tilted or turned away from the camera) and implementations thereof, and other techniques known to those of skill in the art.

The term "facial recognition" or "face recognition" refers to an algorithm for identifying a person's identity based on a detected facial image of the person by applying digital image processing techniques to image information (either still or video frame). One of the ways to do this is by comparing selected facial features from the image and a facial database. For example, an algorithm may analyze the relative position, size, and/or shape of the eyes, nose, cheekbones, and jaw. These features are then used to search for other images with matching features. Other algorithms normalize a gallery of face images and then compress the face data, only saving the data in the image that is useful for face recognition. A probe image is then compared with the face data. Template matching techniques applies a template to a set of salient facial features, providing a compressed face representation. Recognition algorithms can be divided into two main approaches, geometric, which looks at distinguishing features, or photometric, which is a statistical approach that distills an image into values and compares the values with templates to eliminate variances. Common recognition algorithms can use Principal Component Analysis using eigenfaces, Linear Discriminate Analysis, Elastic Bunch Graph Matching using the Fisherface algorithm, the Hidden Markov model, the Multilinear Subspace Learning using tensor representation, the neuronal motivated dynamic link matching, SVM, maximal rejection classifier ("MRC"), and other techniques known to those of skill in the art.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The term "multipoint" conferencing unit refers to a device commonly used to bridge videoconferencing connections. The multipoint control unit can be an endpoint on a network that provides the capability for three or more endpoints and/or gateways to participate in a multipoint conference. The MCU includes a mandatory multipoint controller (MC) and optional multipoint processors (MPs).

The term "video" refers to any relevant digital visual sensory data or information, including utilizing captured still scenes, moving scenes, animated scenes etc., from multimedia, streaming media, interactive or still images etc.

The term "videoconferencing" refers to conduct of a videoconference (also known as a video conference or videoteleconference) by a set of telecommunication technologies which allow two or more locations to communicate by simultaneous two-way video and audio transmissions. It has also been called 'visual collaboration' and is a type of groupware. Videoconferencing differs from videophone calls in that it's designed to serve a conference or multiple locations rather than individuals.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

DETAILED DESCRIPTION

Figure 1:
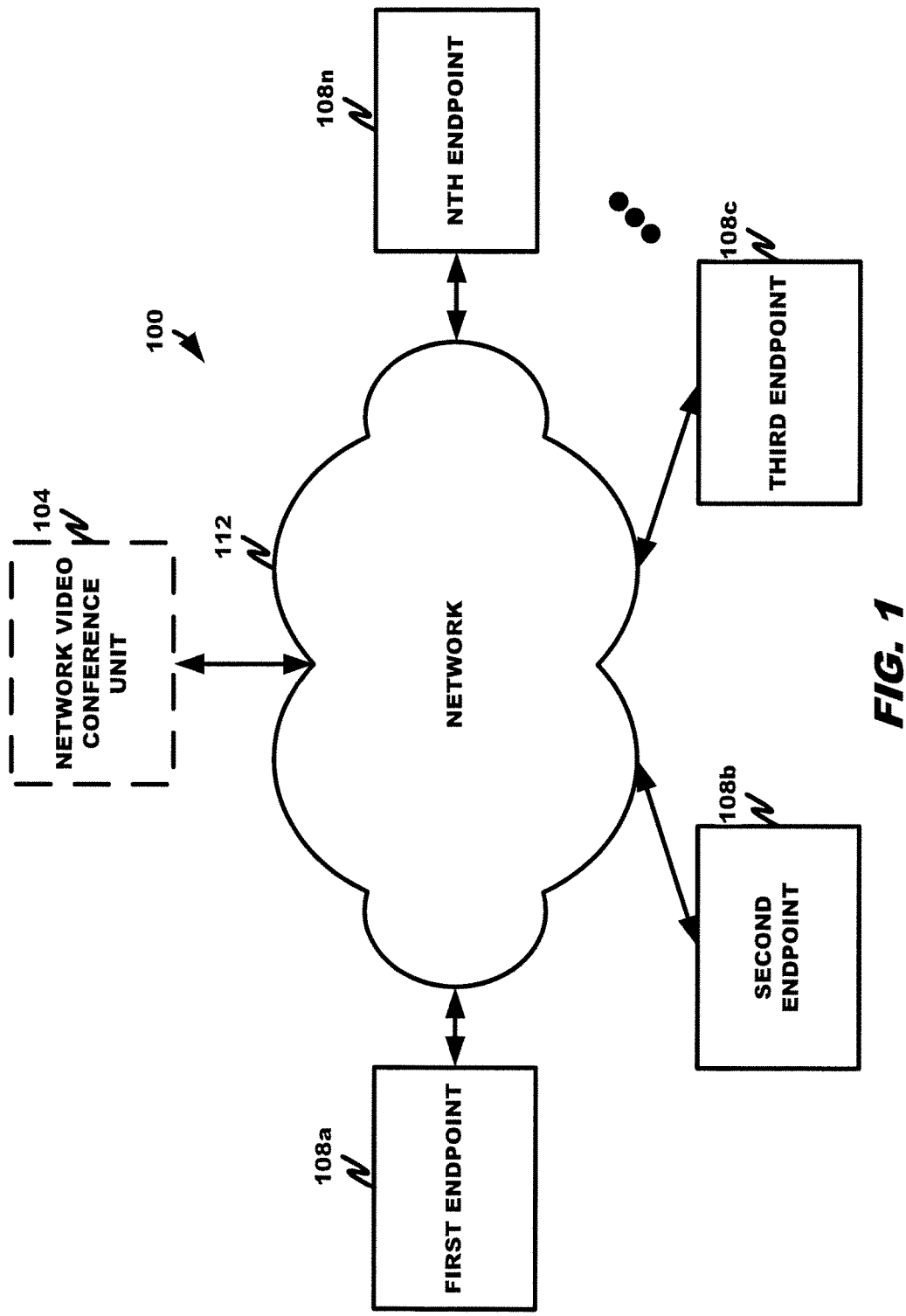
FIG. 1 is a block diagram depicting a system configuration according to an embodiment of the disclosure.

The conferencing system 100 of FIG. 1 generally includes an optional network video conference unit 104 and first, second, third, . . . nth endpoints 108a-n, interconnected by a network 112. While the first and second endpoints 108a,b are depicted, it is to be appreciated that more endpoints can be present and participating in the video conference. The conferencing system 100 can be a personal video conferencing system between two users communicating one-on-one or point-to-point (in which case no MCU is required), a group video conferencing system among three or more people, a mobile video conferencing system involving one or more mobile endpoints and can be a software only solution, hardware only solution, or combination of software and hardware solutions.

The optional network video conference unit 104 can be any network multipoint conferencing unit ("MCU") or video conferencing server ("VCS"). During a multipoint conference session, the MCU can manage multiple endpoints at once, coordinate the video data processing of the multiple endpoints, and forward the flow of media streams among the multiple endpoints. The MCU can conduct group video conferences under the principle of mixing media streams, i.e. mixing and re-encoding participants' video conferencing streams in real time. For example, the MCU can create a picture-in-picture effect. The MCU in most applications includes a multipoint controller ("MC") and optionally one or more multipoint processors ("MPs"). The MCs can coordinate media stream processing parameters between endpoints and typically support the H.245 protocol. The MPs can process, mix and switch multimedia streams.

In contrast, a VCS often implements a multiplexing pattern of the data streams, which implies no transcoding. The VCS typically redirects the media streams of the video conference participants. The compression/decompression and media stream mixing functions are generally performed in the endpoint devices.

The network video conference unit 104 can service any conference topology, including a centralized conference, decentralized conference, or hybrid conference topology. Exemplary video conference units that can be modified as set forth herein include the ELITE 6000™, 6110™, 6120™, 5000™, 5105™, and 5110™ products of Avaya, Inc.

The first, second, third, . . . nth endpoints 108a-n can be any suitable devices for providing a user interface for a voice or video conference. Some of the endpoints can be capable of hosting the voice portion of the conference only or a part of the video conference (e.g., only display images of remote participants but not transmit an image of a local participant or only transmit an image of a local participant but not display images of remote participants) or all of the video conference (e.g., display images of remote participants and transmit an image of the local participant). The first and second endpoints at least capture and optionally display locally to the local participant images of remote participants. Examples of suitable devices include a cellular phone, tablet computer, phablet, laptop, personal computer, and purpose-built devices, such as the SCOPIA XT EXECUTIVE 240™, XT ENDPOINT™, XT1700™, XT4200™, XT4300™, XT5000™, XT Embedded Server™ XT7000, and XT Endpoint™ with embedded server products by Avaya, Inc. that can be modified as set forth herein.

The optional network video conference unit 104 and first, second, third, . . . nth endpoints 108a-n are connected by the network 112. The network 112 can be a local area network ("LAN"), a wide area network ("WAN"), a wireless network, a cable network, a telephone network, the Internet, and/or various other suitable networks in which a video conferencing system can be implemented.

Figure 2:
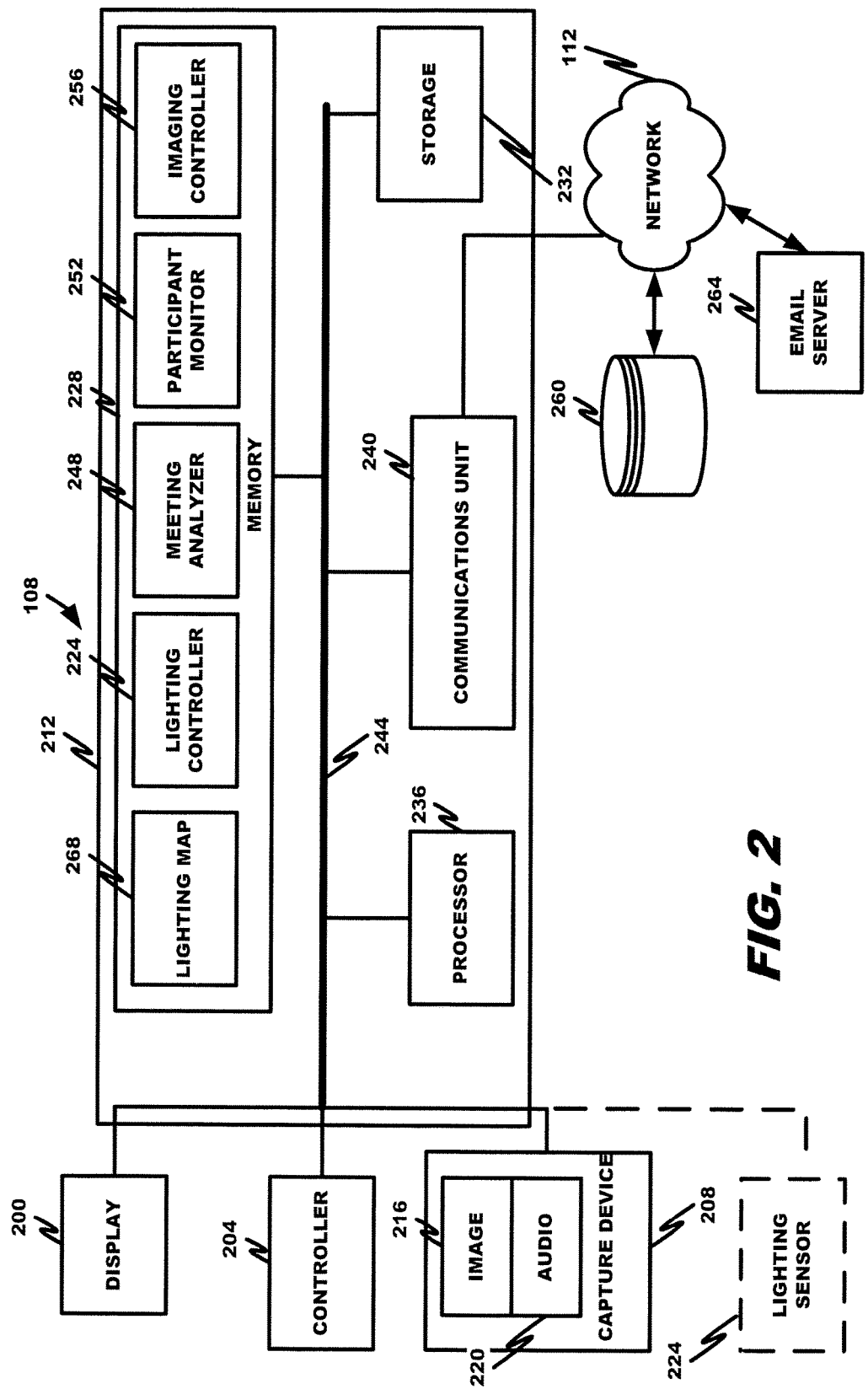
FIG. 2 is a block diagram depicting an endpoint configuration according to an embodiment of the disclosure.

With reference to FIG. 2, an exemplary endpoint is depicted. The exemplary endpoint 108 comprises a display device 200, a controller 204, a capture device 208, and a control unit 212.

The display device 200 can be any appropriate display or screen suitable to display an image stream received from the control unit 212. The display device 200 may display an image stream received at the control unit 212 from one of the remote video conferencing endpoints over the communications network 108. Alternatively and/or additionally, the image stream received from the image capture device 208 may be displayed by the display device 200 and/or processed by the control unit 212 before transmission to the display device 200.

The controller 204 can be any type of input devices, such as a keyboard, a pointing device (e.g. mouse, trackball, pointing stick, etc.), a remote control unit or a touchscreen device enabling a participant of the video conferencing room to interact with the control unit 212.

The capture device 208 can include an image capturing device 216, such as one or more still or video cameras capable of capturing 2-dimensional or 3-dimensional image information, and an audio capturing device 220, such as one or more microphones. The image capturing device 216 captures and provides image streams to the control unit 212. The image capturing device 216 typically comprises one or more mechanical or digital Pan-Tilt-Zoom (PTZ) cameras. However, those skilled in the art will appreciate that other types of cameras may also be used. The audio capturing device 220 can comprise an array of microphones to capture and provide the audio streams to the control unit 212.

The control unit 212 generally comprises a memory 228, a storage unit 232, a processor 236 and a communications unit 240. The control unit 212 can communicate (i.e. exchange audio and video information and/or any additional data), over the communications network 112, with the other video conferencing endpoints and the network video conference unit 104, access an enterprise database 260 comprising subscriber information, or interact with an enterprise email server 264 comprising subscriber email correspondence. This display device 200 can provide a command and control interface for the user.

The memory 228 can be any computer readable medium, such as a random access memory (RAM) or other dynamic storage device (e.g. dynamic RAM, static RAM, synchronous RAM, etc.) coupled to the bus 244 for storing information and instructions to be executed by the processor 236. Additionally, the memory 228 may be used to store temporary variables and/or other intermediate information during the execution of instructions by processor 236. It will be appreciated by those skilled in the art that the memory 228 may be a single memory or split into a plurality of memories. For example, a further memory may be provided such as a read only memory (ROM) or any other static storage (e.g. programmable ROM, erasable programmable ROM, and electrically erasable programmable ROM, etc.) coupled to the bus for storing static information and instructions for the processor 236.

The storage unit 232 can be a further computer readable medium, such as a magnetic hard disk, or a removable media drive (e.g. floppy disc drive, read-only compact disc drive, read/write compact disc drive, compact disc jukebox, tape drive, and removable magneto-optical drive), etc. coupled to the bus for storing other information and/or instructions.

The processor 236 can process any command received from a video conferencing user, triggered by the video conferencing endpoint 108 or received from the communications network 112 (e.g. from the network video conference unit 104 and/or from another video conferencing endpoint 108). In response to a received command, the processor 236 can retrieve and execute the relevant set(s) of instructions from one of the memories 228 and 232. Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARIV1926EJS™ processors, other industry-equivalent processors, and may perform computational functions using any known or future-developed standard, instruction set, libraries, and/or architecture. Those skilled in the art will appreciate that the present disclosure is not limited to this single processor arrangement but that one or more processors in a multi-processor arrangement may be employed to execute the set(s) of instructions retrieved from one of the memories.

Finally, the communications unit 240 is generally a communication interface providing a two-way communication coupling between the video conferencing endpoint 108 and the communications network 112. The communications unit 240 can receive any type of data information from the different devices of the video conferencing endpoint 108 such as the display device 200, the controller 204, and the capture device 208 and pass the data information to the processor 236 for further processing and/or to other video conferencing endpoints of the video conferencing system 100 over the communications network 112. Also, the communications unit 240 can receive any additional data information received by a further device present in the video conferencing endpoint 108. The communication unit 139 can exchange (e.g. transmit and receive) any suitable type of data information with a plurality of devices coupled to the control unit 212 and exchange information with remote video conferencing endpoints 108 or the network video conference unit 104 of the video conferencing system 100 over the communications network 112.

Included in the memory 228 of the control unit 212 are a lighting controller 224, lighting map 268, meeting analyzer 248, participant monitor 252, and imaging controller 256.

The lighting controller 224 automatically activates or deactivates and/or adjusts the settings of lights in the meeting area according to a determined focal point of the meeting. For example, while the image capture device 216 captures a view of the entire meeting area, the lighting controller 224 can change the brightness or intensity and/or color of the lighting to emphasize and deemphasize one or more selected features in the meeting area, such as an active or inactive speaker and presentation resource, such as a whiteboard. In another example, the lighting controller 224 analyzes the intensity and/or color of the lighting in the meeting area and alters automatically the lighting settings to comply with selected user experience metrics. To illustrate, levels of ambient light, particularly in a meeting area with windows, can change from meeting to meeting due to variations in sunlight. A given participant can appear differently from meeting to meeting due to the lighting variations. The lighting controller 224 can adjust lighting settings to provide a substantially constant appearance of the participant not only during a meeting but also from meeting to meeting.

The lighting map can be an electronic map that maps or locates lighting relative to selected physical point of reference in the meeting area and characterizes the lighting elements. Each lighting element, such as a light or light switch, is characterized by one or more of a corresponding set of coordinates relative to the selected point of reference, a wattage level, a type of light (e.g., LED, fluorescent, compact fluorescent, incandescent, and halogen), color of light (e.g., white, violet, blue, green, yellow, orange and red), intensity variability of the light (e.g., variable or invariable intensity adjustments (such as variable adjustments by a dimmer) and for variable intensity lighting % variation in intensity for different settings), relationships of lights (e.g., controlled by common or different switches), relationships of lights and switches (e.g., what lights are controlled by each located switch), whether the lighting element is wirelessly controlled directly or indirectly by another component and the network address for those lighting elements that are controlled wirelessly.

The meeting analyzer 248 can analyze the meeting parameters, content, and activity to determine an initial and in-progress focal point of the meeting. The meeting analyzer 248 typically considers various information sources in focal point determination. For example, the meeting analyzer 248 can access, via the enterprise database 260, electronic calendars of one or more participant subscribers to determine, from the Outlook™ meeting invitation, the meeting parameters (e.g., beginning and ending times, meeting duration, meeting attendee identities and locations, meeting attendee contact information (e.g., electronic addresses), identity of meeting organizer, enterprise hierarchy (or office or position) of the meeting participants, meeting subject, meeting agenda from the meeting notes, and meeting presentations or discussion topics from the attachments). The meeting analyzer 248 can access, via the email server 264, pre-meeting email threads among the communication devices of the participants regarding the meeting. Based on this information, the meeting analyzer 248 can employ natural language processing to determine, for instance, the organization or agenda of the meeting, such as who will be presenting or speaking, during what time interval, and about what topics, when the meeting is open for questions from other participants, and the like. The meeting analyzer 248 can track temporally the progression of the presenter through a presentation, such as a Microsoft Power Point™ presentation, and determine how many slides have been reviewed and/or how many slides have yet to be reviewed. With this information, text and speech recognition and biometric information can be used by the meeting analyzer 248 to identify audio cues as to the identity of the speaker, a current location in the meeting agenda, and the like.

The participant monitor 252 can acquire the facial images of each participant in the captured image using face detection techniques, acquire other object images in the captured image (such as a whiteboard, table, chair, and the like) using digital processing techniques, determine an identity of each acquired facial image by face recognition techniques using an identified biometric information of the participant, determine a spatial location of each participant relative to the capture device and to one or more other participants such as by motion detection, determine an active speaker using speaker localization and a microphone array, determine a point of focus of one or more participants in the room by gaze detection, and the like. The participant monitor 252, using face detection techniques, microphone array analysis, or motion detection, can detect a participant entering or leaving the monitored communication session area, e.g., room.

The meeting analyzer 248 and participant monitor 252 commonly provide the determined information to the imaging controller 256, which can determine, based on rules and user input, which image should be provided to remote participant endpoints at any point in time during the communication session, or to define a set of optimal views for the video conferencing session identified by image processing and contextual analysis. The imaging controller 256, for instance, is able to identify and adjust the capture device (e.g., adjust the pan, tilt or zoom of a camera) to a selected optimal view of the meeting area or participant or object therein at a selected time. The imaging controller 256, in turn, provides a description of which image should be provided to remote participant endpoints at the current selected point in time during the communication session or the selected set of optimal views to the lighting controller 224, which uses the image information to selected appropriate lighting settings. By way of illustration, an optimal view could include having all participants in frame, in focus and centralized in the captured image, and having substantially the least background image information in frame. In this configuration, the lighting controller 224 modifies the lighting elements to provide substantially uniform lighting to all of the in-image meeting participants. Other optimal views include whiteboard focus in which the whiteboard is in focus and centralized e.g., from the view of the camera) in the captured image (in which the lighting controller 224 adjusts the lighting elements to illuminate the whiteboard more than at least some of the participants in the meeting area), and focus on a selected meeting participant (e.g., meeting manager, presenter, speaker, etc.) with the selected meeting participant being in focus and centralized (from the view of the camera) in the captured image (in which the lighting controller 224 adjusts the lighting elements to illuminate the selected meeting participant more than at least some of the other participants in the meeting area).

While the discussion envisions the use of lighting control and view selection based on meeting context, it is to be understood that lighting control based on meeting context can be used by the system as a standalone image selection mechanism. To illustrate, the camera can capture a single view the meeting area and, by varying lighting, capture objects of interest in the room while darkening objects not of interest. Viewers at the remote endpoint will naturally move their gaze from poorly illuminated objects to well illuminated objects, thereby reproducing a similar viewer experience to that in which cameras are moved or switched to capture different selected images. Lighting effectively emphasizes dynamically what is important and produces a theatre stage effect.

Figure 6:
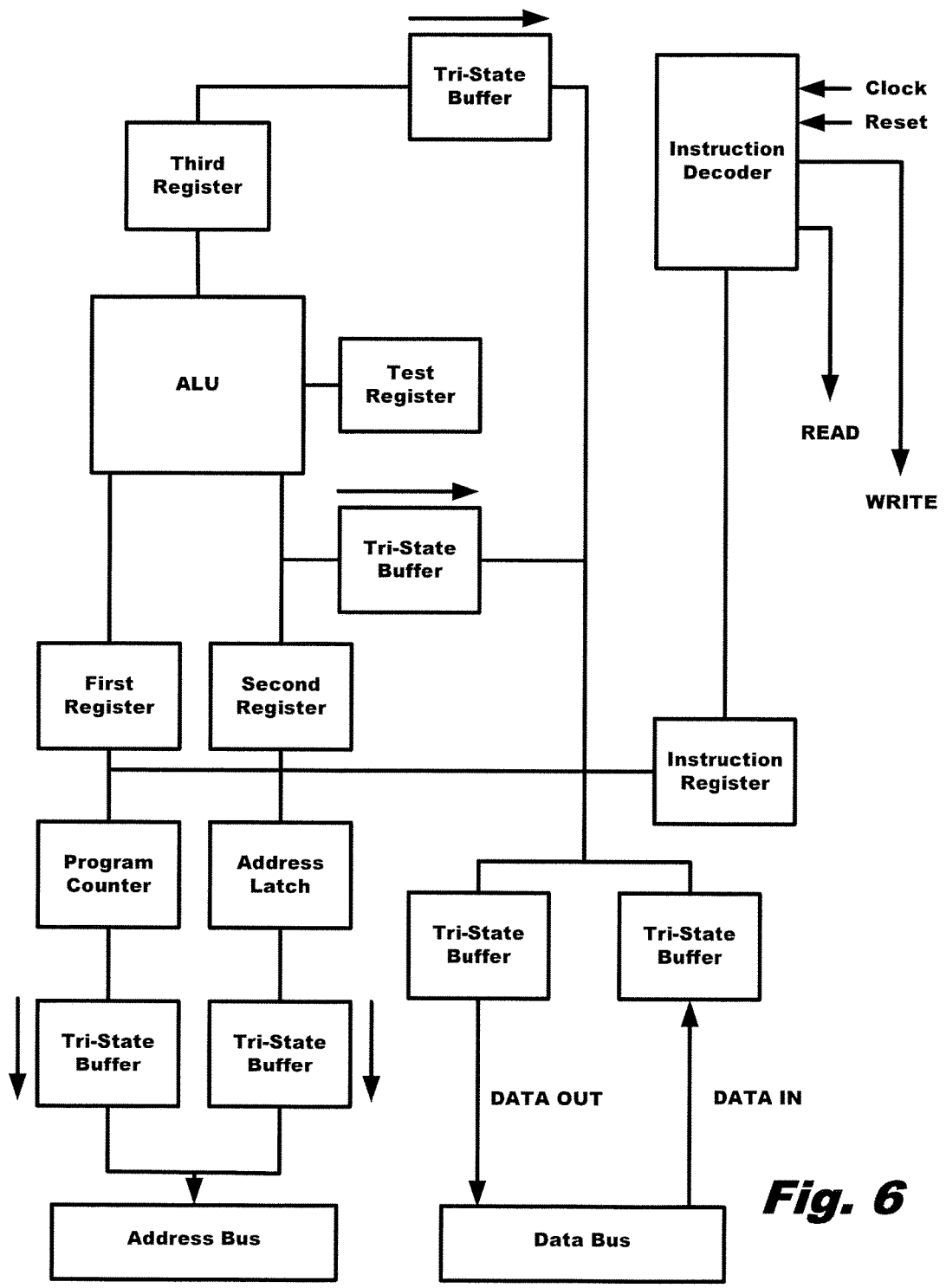
FIG. 6 is a block diagram of hardware for the control unit according to an embodiment.

With reference to FIG. 6, the control unit 212 can execute the lighting controller 224, meeting analyzer 248, particant monitor 252, and imaging controller 256 using an arithmetic/logic unit ("ALU"), which performs mathematical operations, such as addition, subtraction, multiplication, and division, machine instructions, an address bus (that sends an address to memory), a data bus (that can send data to memory or receive data from memory), a read and write line to tell the memory whether to set or get the addressed location, a clock line that enables a clock pulse to sequence the processor, and a reset line that resets the program counter to zero or another value and restarts execution. The arithmetic/logic unit can be a floating point processor that performs operations on floating point numbers. The control unit 212 further includes first, second, and third registers that are typically configured from flip-flops, an address latch, a program counter (which can increment by "1" and reset to "0"), a test register to hold values from comparisons performed in the arithmetic/logic unit, plural tri-state buffers to pass a "1" or "0" or disconnect its output (thereby allowing multiple outputs to connect to a wire but only one of them to actually drive a "1" or "0" into the line), and an instruction register and decoder to control other components. Control lines, in the verification system, from the instruction decoder can: command the first register to latch the value currently on the data bus, command the second register to latch the value currently on the data bus, command the third register to latch the value currently output by the ALU, command the program counter register to latch the value currently on the data bus, command the address register to latch the value currently on the data bus, command the instruction register to latch the value currently on the data bus, command the program counter to increment, command the program counter to reset to zero, activate any of the plural tri-state buffers (plural separate lines), command the ALU what operation to perform, command the test register to latch the ALU's test bits, activate the read line, and activate the write line. Bits from the test register and clock line as well as the bits from the instruction register come into the instruction decoder. The ALU executes instructions for image capturing device(s) and audio capturing device(s) and display and playback of collected image and audio information.

Figure 3:
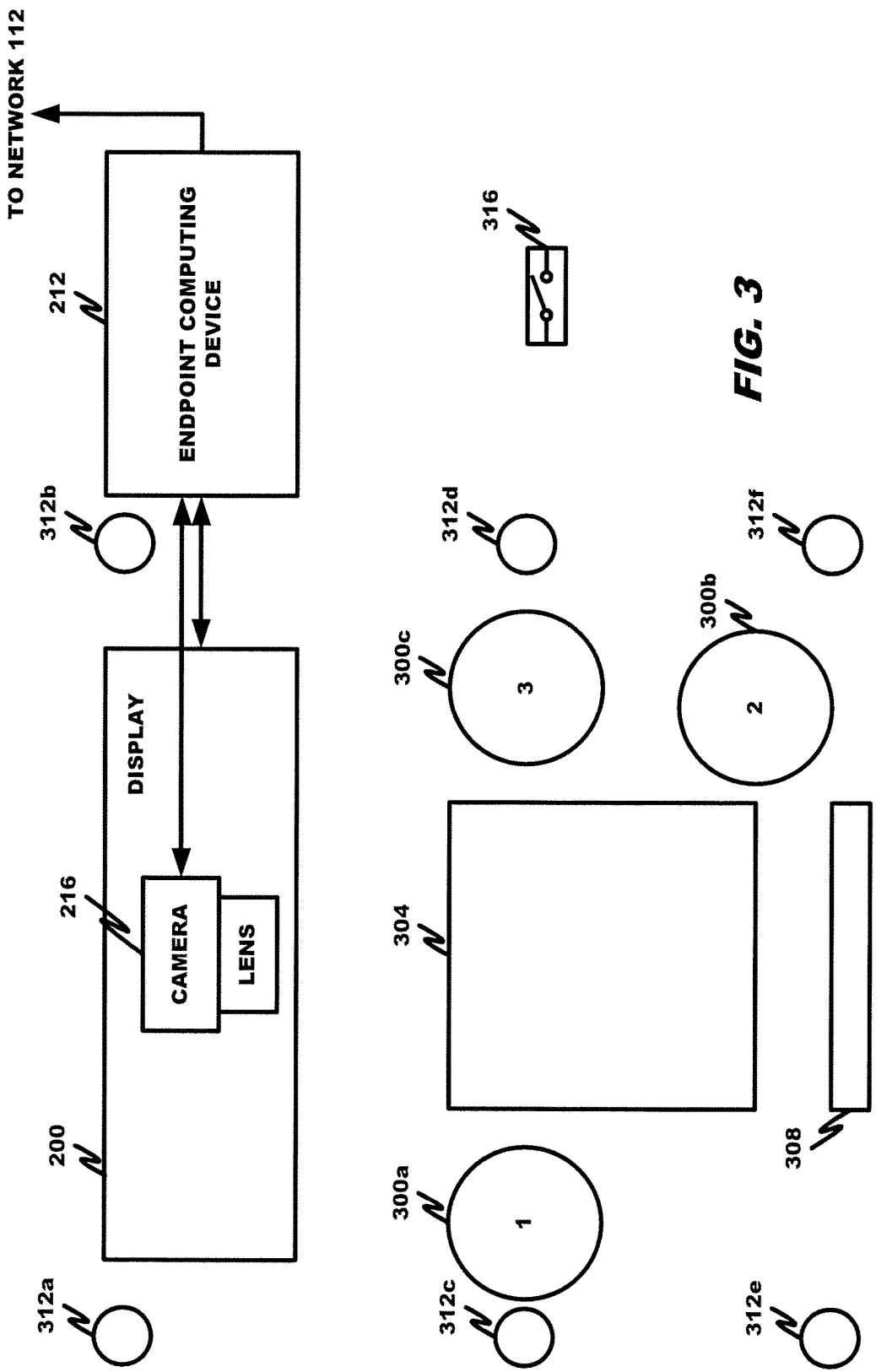
FIG. 3 is a block diagram an exemplary endpoint configuration during a video conferencing session.

An example of a video conferencing communication session will be discussed with reference to FIGS. 2-3. The meeting room includes first, second, and third participants 300a, b, c, a conference table 304, and whiteboard 308. The participant monitor 252 detects the faces of each of the first, second, and third participants 300a-c, the table 304, and whiteboard 304 and identifies each of the first, second, and third participants 300a-c. At the beginning of the video conferencing communication session, the imaging controller 256 selects as the optimal view a view having the first, second, and third participants 300a-c in frame, in focus and centralized with reference to the captured image, with minimal background in the captured image. The imaging controller 256 adjusts the pan, tilt, and zoom of the camera 216 to produce this view, and the lighting controller 224, based on the relative locations of the first, second, and third participants 300a-c, selects and controls lighting elements 312c-f to provide substantially uniform lighting for imaging each of the first, second, and third participants 300a-c. After the video conferencing communication session commences and after a selected time interval has elapsed, the second participant 300b becomes the active speaker and stands and walks to the whiteboard 304. The imaging controller 256, in response, selects as the optimal view a view having the whiteboard 308 and second participant 300b in frame, in focus and centralized in the captured image, with neither the first nor third participant 300a and c in frame. The imaging controller 256 adjusts the pan, tilt, and zoom of the camera 216 to produce this view, and the lighting controller 224, based on the relative locations of the first, second, and third participants 300a-c and whiteboard 308, selects and controls lighting elements 312e and 312f to provide more lighting for the second participant 300b and whiteboard 308 and lighting elements 312c and 312d to provide less lighting for the first and third participants 300a and c so as to emphasize in the captured image the second participant 300b and the whiteboard 308 while deemphasizing the first and third participants 300a and c. Later in the meeting and after the selected time interval has again passed, the first participant 300a becomes the active speaker, and the imaging controller 256, in response, selects as the optimal view a view having the first participant in frame, in focus and centralized in the captured image, with neither the second nor third participant 300b and c in frame. The imaging controller 256 adjusts the pan, tilt, and zoom of the camera 216 to produce this view, and the lighting controller 224, based on the relative locations of the first, second, and third participants 300a-c and whiteboard 308, selects and controls lighting element 312c to provide more lighting for the first participant 300a and lighting elements 312d-f to provide less lighting for the second and third participants 300b and c and whiteboard 308 so as to emphasize in the captured image the first participant 300a while deemphasizing the second and third participants 300b and c and whiteboard 308. Later in the meeting and after the selected time interval has again passed, the first participant 300a starts presenting, through web conferencing software such as Avaya Aura Conferencing™, a Power-Point™ presentation having 10 slides. The imaging controller 256, due to the number of slides and/or tracking the slide transitions from slide to slide, determines that the optimal view is the view having the first participant 300a in frame, in focus and centralized in the captured image, with neither the second nor third participant 300b and c or whiteboard 308 in frame. The lighting settings are not changed from the prior view because the slides are presented in a portion of the layout on each display device of each endpoint. The imaging controller 256 further determines that all questions are to be asked at the end of the presentation and, when the presentation ends, selects as the optimal view a view having the first, second, and third participants 300a-c in frame, in focus and centralized, with minimal background in the captured image. The imaging controller 256 adjusts the pan, tilt, and zoom of the camera 216 to produce this view, and the lighting controller 224, based on the relative locations of the first, second, and third participants 300a-c, selects and controls lighting elements 312c-f to provide substantially uniform lighting for imaging each of the first, second, and third participants 300a-c.

In some configurations, the lighting elements comprise one or more light switches 316 that control one or more lights 312. When the light switch but not the corresponding set of controlled lighting elements is wirelessly controllable, the lighting controller controls the switch and corresponding set of controlled lighting elements to produce substantially uniform lighting by the controlled lighting elements. While this may not be an optimal solution to emphasize and deemphasize selected participants or the whiteboard, the lighting can still be substantially optimized by the lighting controller to provide a more presentable or desirable image of the participants, such as to better represent a skin tone or other facial feature of the participant(s) which can be distorted by the uncontrolled lighting in the meeting area.

In some applications, the lights themselves are wireless controllable. Examples include smart light bulbs. As will be appreciated, these are commonly LED lights bulbs that are controlled by Bluetooth or WiFi signaling to adjust color and/or brightness or intensity of the output light.

The wireless control of the lighting elements or switches can be done by a number of differing protocols. For example, the protocols include Bluetooth, WiFi, ZigBee, and others. The technical standards for network-based lighting system control include Digital Signal Interface (DSI), IEC 60929, IEC 62386, and others. A DAI (Digital Addressable Lighting Interface) is a data protocol and transport mechanism. A typical DALI network includes a controller and one or more lighting devices (e.g., electrical ballasts and dimmers) that have DALI interfaces. The controller can monitor and control each light by means of a bi-directional data exchange. The DALI protocol permits devices to be individually addressed and it also incorporates Group and Scene broadcast messages to simultaneously address multiple devices (e.g., "Group 1 goto 100%" or "Recall Scene 1"). Each lighting device is assigned a unique static address in the numeric range 0 to 63, making possible up to 64 devices in a standalone system. Addresses may be arbitrarily assigned and devices need not be mapped to contiguous addresses (gaps may exist in the address map). A system comprising multiple DALI. gateways can address more than 64 devices. Data is transferred between controller and devices by means of an asynchronous, half-duplex, serial protocol over a two-wire bus or wireless network, with a fixed data transfer rate of 1200 bit/s. The DALI protocol provides 256 levels of brightness between off and 100%, which is translated to a ballast power level via a logarithmic dimming curve. This curve gives larger increments in brightness at high dim levels and smaller increments at low dim levels.

As shown by the above description, the changes in camera views are not automatic after every active speaker change or with every whiteboard demonstration. The transition between views is typically contingent upon passage of the selected time interval since the last view change and/or last detected speaker change. For example, if a participant speaks and/or works on the whiteboard for a period longer that X minutes, then the imaging controller 256 determines that it is worth adjusting the camera. Other factors can also impact this decision, such as speaker identity.

Figure 4:
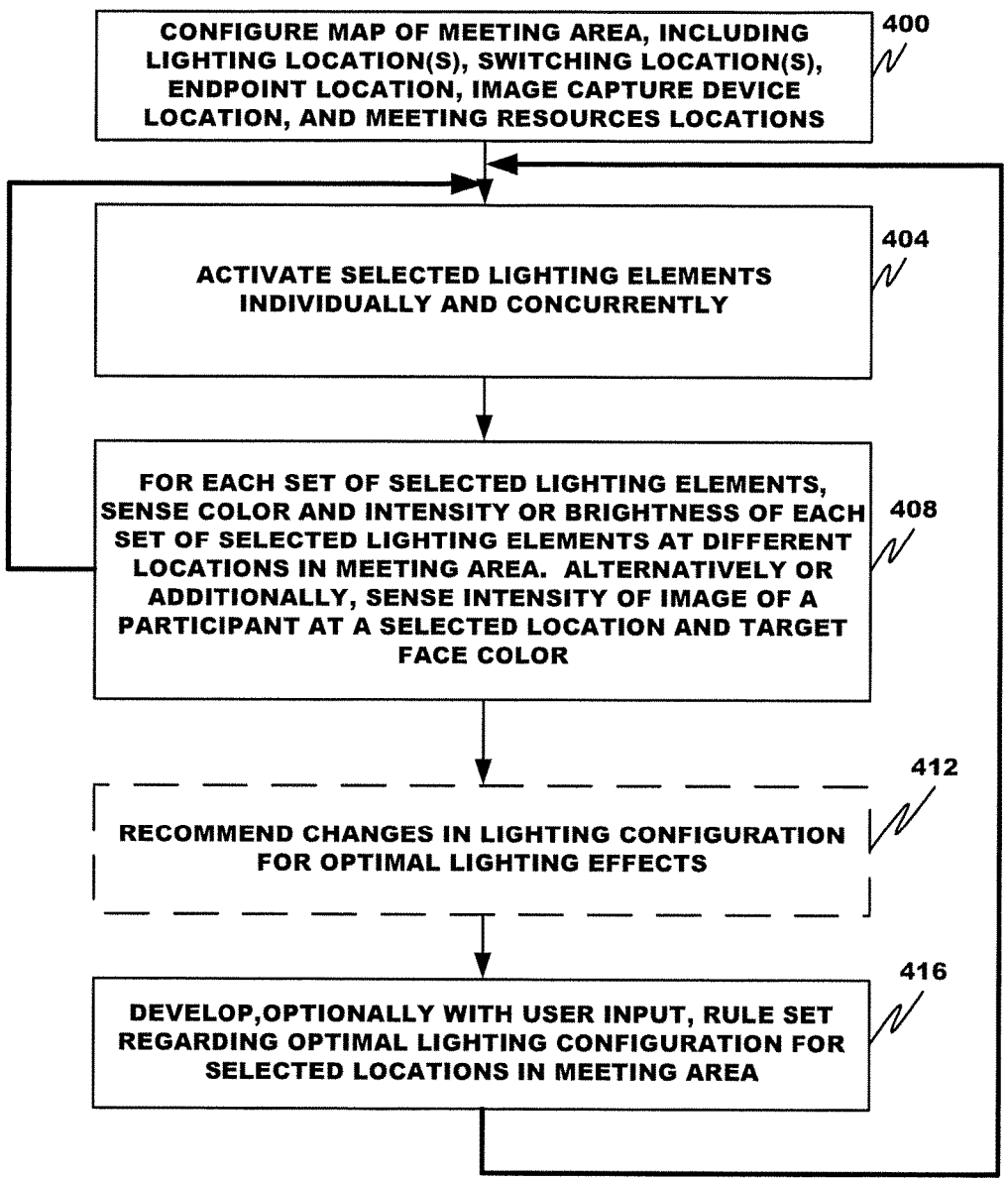
FIG. 4 is a flow chart depicting lighting calibration or characterization logic according to the embodiment.

FIG. 4 illustrates a software controlled process for configuring a set of lighting elements in a meeting area.

In step 400, the lighting controller configures a map of the meeting area, optionally including in addition to the data structures noted above endpoint location, image capture device location, and meeting resource locations. This can be generated by manual input, such as using a graphical user interface providing a display of the meeting area that is editable by the user to include lighting elements, endpoint location, image and/or audio capture device location, and meeting resource locations. The map can also be generated automatically by network discovery techniques (e.g., polling or pinging nodes using the SNMP protocol), which creates a topology of the various nodes in the network. As noted, the nodes are communication devices, such as signaling interfaces of one or more lighting elements, endpoints, image capture devices, audio capture devices, and the like. By way of illustration, the lighting controller can use a temporary or initial set of possible valid addresses on the network, ping each of the addresses in the temporary or initial set to validate them, add each valid address to a permanent set of valid addresses (possibly using traceroute packets to determine connectedness of discovered network nodes), apply selected heuristics to the permanent address set, and generate new addresses to add to the temporary set by which to repeat the foregoing steps as to the new addresses.

While the map can show relative spatial locations of meeting room resources (e.g., whiteboard, seats, conference table, endpoint, windows, and the like) compared to lighting element locations to enable quick mapping of active speaker location with lighting element location, this is often not necessary. Movement of PanTiltZoom (PTZ) cameras can be tracked in real time, thereby enabling spatial location of active speaker or meeting participant or other resource of interest to be determined. The spatial locations of the PTZ camera and, microphone array and meeting area size can be included in the electronic map 268, When a microphone array detects an active speaker, the PTZ camera can move and, using face detection, locate the active speaker. The orientation of the PTZ camera relative to a selected reference point (which can be the JTZ camera rotational axis) can approximately locate spatially the active speaker, thereby enabling the lighting controller to select appropriate lighting elements for optimal lighting, Camera movement can be done before a call begins to identify the location of each potential object of interest to meeting participants. Each local participant can speak in sequence, causing the camera to move through active speaker tracking.

In optional step 404, the lighting controller selects a first set of lighting elements to be individually and collectively activated.

In step 408, the lighting controller, for each selected set of lighting elements, senses color and intensity or brightness of one or members of each selected set of lighting elements at different locations in the meeting area or, alternatively or additionally, senses intensity by comparing a captured facial image or facial feature of a selected participant at a selected location against a target face color or hue. This determines lighting element properties and characteristics and lighting effects (or configuration) in the meeting room. This can be done using image processing by identifying one or more participant faces or facial features using face detection, varying the lighting element(s) properties (e.g., on/off state, color, intensity, brightness, etc.) as well as exposure of the image capture device until one or more of the detected face images is approximately equal to a target mean color for the participant face or facial feature (e.g., skin tone). In some applications, the exposure of the image capture device is held constant while the lighting elements are adjusted. This can be combined with face-tracking based auto exposure control (which tracks the face region and uses the intensity of the face region to control the camera exposure) to provide even better results. In other embodiments, photosensors are placed at selected spatial locations around the meeting area, Photosensors detect the presence and determine the magnitude of visible light, infrared transmission, and/or ultraviolet energy. As lighting elements are activated and deactivated and adjusted, the photosensors can detect and quantify lighting effects at the different selected spatial locations.

The lighting controller then returns to step 404 and selects a next set of lighting elements for analysis in step 408. As the analysis is completed, the electronic lighting map 268 is updated as appropriate.

When all lighting elements have been analyzed, the lighting controller, in optional step 412, recommends, for each selected location in the meeting area, changes in lighting configuration or settings for optimal lighting effects. For example, it can recommend adding additional or supplemental lighting elements for certain meeting room locations, increasing or decreasing lighting element wattage, changing the color spectrum output by a lighting element, and the like.

In step 416, the lighting controller develops, optionally with user input via a graphical user interface, a rule set regarding optimal lighting configuration for selected locations in the meeting area. For example, a lookup table can then be generated mapping lighting element state and setting against lighting effects at different locations in the meeting area. The lookup table can be used to produce selected lighting effects based on focal point determination.

The above steps can be performed once during set up of the endpoint, at the beginning of each conference call to take ambient (e.g., daylight) lighting levels into account, and/or at various points during the conference call to take ambient (e.g., daylight) lighting level variations into account.

In some embodiments, no rules or lookup table is generated in step 416. Instead, image processing is used by the lighting controller, in substantial real time with image capture, to determine and alter lighting effects to realize preferred image properties of one or more participants.

In some embodiments, the rules or lookup table are updated, in substantial real time with image capture, based on image processing that determines the effects of lighting on image properties of one or more participants or a facial feature thereof. In this way, the effects of ambient lighting or variations in ambient lighting, such as due to lights in an adjacent room being turned on or off of shades being drawn or opened, are taken into account.

Figure 5:
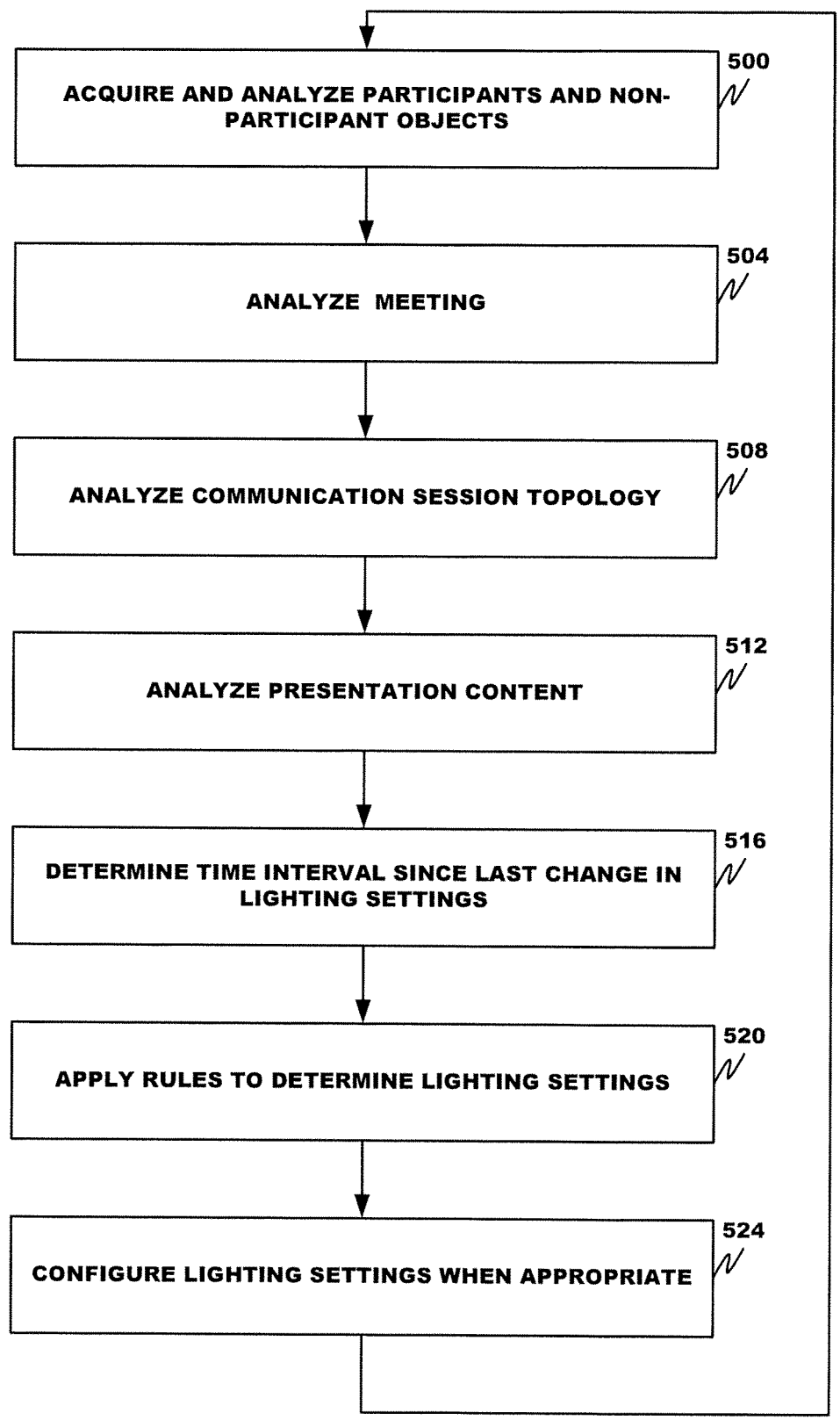
FIG. 5 depicts a flow chart depicting a lighting control logic according to the embodiment.

The operation of the control unit 212 will now be described with reference to FIGS. 2 and 5.

In step 500, the participant monitor 252 acquires and analyzes participants and non-participant objects of interest in the monitored area for the communication session. It determines where participants are seated, what objects are in the room (such as whiteboard, table, and projector screen), and whether there are participants seated outside the field of view of the camera. The monitor 252 further determines whether there have been participant changes since the last image acquisition and analysis. Participant changes, for instance, include a new participant entering the room, a participant leaving the room, a participant moving to a seating location outside the field of view of the image capture device.

In steps 504, 508, and 512, the meeting analyzer 248 analyzes the meeting, communication session topology, and presentation context. The meeting analysis typically includes, for instance, analysis of the electronic calendars and email threads of one or more participant subscribers to determine the meeting parameters, and the presentation contextual analysis includes, for example, keyword identification to identify, by text-to-speech or speech-to-text analysis of the communication session conversation, the current focal point(s) of the meeting. The communication session topology refers to the electronic addresses, capabilities, and preferences of the endpoints 108 to the communication session and the network video conference unit 104.

In step 516, the imaging controller 256 determines a time interval since a last change by the lighting controller of a lighting configuration or setting in the meeting area. Too many lighting element changes during the meeting over too short a period of time can be very distracting to participants. Typically a temporal threshold, such as at least about 1 minute is used to limit the frequency of lighting element changes; that is, when the time interval since last lighting element change is less than the temporal threshold, no further image change is permissible.

Where the camera remains stationary during the video communication session, transitions between objects of interest can be softened by progressively dimming the intensity of lighting in an area of a former object of interest while progressively increasing the intensity of lighting on an area of a current or new object of interest. Alternatively, the dimming and lighting can be done quickly and dramatically to move the viewer from a first object of interest to a second object of interest. The time interval over which lighting is varied can be selected by the user prior to commencement of the video communication session.

In step 520, the imaging controller 256 applies rules to determine the optimal lighting effect(s) based on the input of the participant monitor 252 and meeting analyzer 248. The optimal lighting effect(s) are selected based upon the current meeting state, as determined by the input, and timing of the last displayed image change. The imaging controller 256 and/or lighting controller 224 identify one or more points in time where the user experience benefits more from changing the view to be displayed by the remote endpoints and lighting effect(s) than it would be disturbed by moving the camera or otherwise changing the view or lighting effect(s). Examples of times where the user benefit from the view or lighting change outweighs the user distraction include the start of the video conference, at selected points in time during a long video conference, and the like. Normally, the imaging controller 256 makes one to only a few view and/or lighting changes in the course of a single meeting. Where a participant has moved to a seat outside the field of view of the camera or a new participant has entered the room and selected a seat outside the field of view, the imaging controller 256 may elect to adjust the view and/or lighting in response to the participant entry or relocation or only once that participant starts speaking.

Different participant speakers can have different thresholds for view and/or lighting change from a first view to a second view. For example, the manager, when speaking, can have a lower threshold for view change and/or lighting from a first view and/or lighting effect not focused on the manager to a second view and/or lighting effect focused on the manager than a similar view change for another participant, when speaking. A higher level manager, when speaking, can have a lower threshold for view and/or lighting effect change from a first view and/or lighting effect not focused on the manager to a second view and/or lighting effect focused on the manager than a similar view change for a lower level employee, when speaking. Stated differently, hierarchical ranking of participants within an enterprise management structure can be used to determine a corresponding threshold for view and/or lighting effect change from a first view and/or lighting effect not focused on the participant to a second view and/or lighting effect focused on the participant when the participant starts speaking.

In step 524, the control unit 212, when appropriate, commands the pan, tilt or zoom of the camera to be changed to implement the new view and/or the lighting elements to produce selected lighting effect(s). The speed of the changes can be carefully controlled to avoid participant irritation. While lighting effects will typically be changed in response to changes in a captured view, lighting effects can be changed to highlight a change in focal point of interest even though the captured view itself is unchanged. For example, a panoramic view of multiple participants may be maintained even though active speaker varies from of the multiple participants to a different one of the multiple participants, which change is highlighted by changing in lighting effect(s) to highlight each of the active speakers.

The control unit 212 then returns to and repeats the above steps after a selected time interval has passed in the video conferencing communication session.

A "best view" and/or "best lighting effect" button can be provided so that a participant can manually request an optimal view or lighting effect change at any point before or during the video conferencing communication session. This user command would override the determination of the control unit 212.

At set times during the video conferencing communication session, a participant or administrator can command an optimal view or lighting effect(s) to be provided notwithstanding the determination of the control unit 212. For example, an optimal view or lighting effect(s) can be provided after five minutes has passed since the initiation of the video conferencing communication session.\

Even for a manual override or other participant or administrator command, the meeting analyzer still determines or computes the optimal view and/or lighting effect(s) automatically. The only thing that is done manually is the invoking of a control at a single moment. For example, the participant user can press a button in the remote control that invokes the view and/or lighting effect(s) optimization.

Meeting types can be used to provide default conference and viewing and/or lighting parameters for meeting venues and meeting organizers or hosts. In other words, different rule sets can apply to different types of meetings. Exemplary types of meetings are participant-only meetings with no whiteboard or presentation and no speaker restrictions, meetings with only one designated speaker in the venue, meetings with a whiteboard in use, and meetings with a presentation.

Any of the steps, functions, and operations discussed herein can be performed continuously and automatically.

The exemplary systems and methods of this disclosure have been described in relation to video conferencing communication sessions. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a server, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A video-enabled communication system, comprising:
a processor; and
a computer readable medium comprising a lighting controller that causes the processor to select a lighting configuration for a local participant to be captured by a camera for provision to a remote participant endpoint for display to another participant, the selected lighting configuration being based on information describing the local participant or context of a video communication session, wherein the processor conditions a change from providing, to the remote participant endpoint for display, a first image captured under a first lighting configuration selected at a first time to a second image captured under a second lighting configuration selected at a second time upon a difference between the first and second times having at least a threshold magnitude.

2. The system of claim 1, wherein the processor conditions the change from providing, to the remote participant endpoint for display, the first image captured under the first lighting configuration selected at the first time to the second image captured under the second lighting configuration selected at the second time upon the difference between the first and second times having the least a threshold magnitude, wherein the first image is of a first set of objects and the second image is of a different second set of objects, wherein the image provided by the processor to the remote participant endpoint for display throughout a duration of the video communication session is captured by the camera, wherein the camera remains stationary while capturing the first and second images, wherein the lighting controller causes the processor to create or update an electronic map of a meeting area comprising the local participant, the electronic map comprising, for each lighting element, a corresponding one or more of a set of coordinates relative to a selected point of reference, a wattage level of the lighting element, a type of the lighting element, a color of light output by the lighting element, an intensity variability of the lighting element, when the lighting element has variable intensity, a percentage variation in intensity for different settings, a relationship of the lighting element to another lighting element, whether the lighting element is wirelessly controlled directly or indirectly by another lighting element, or an electronic address of the lighting element, and wherein the lighting controller selects each of a plurality of lighting elements and, for each of the plurality of lighting elements, determines one or more of a color of output light, an intensity of output light, or a brightness of output light.

3. The system of claim 1, wherein the first lighting configuration and the second lighting configuration each comprise one or more of an activated light, a deactivated light, a brightness or intensity level, or a color spectrum, wherein the processor controls the first and second lighting configuration based on the information describing the local participant or context of the video communication session, and wherein the information describing the local participant or context of the video communication session comprises one or more of local participant locations based upon detection of a face of the local participant, an identity of the local participant, or movement of the local participant from one location to another.

4. The system of claim 1, wherein the first lighting configuration and the second lighting configuration each comprise one or more of an activated light, a deactivated light, a brightness or intensity level, or a color spectrum, wherein the processor controls the first and second lighting configuration based on the information describing the local participant or context of the video communication session, and wherein the information describing the local participant or context of the video communication session comprises one or more of a use of a key word or phrase during the video communication session, an estimated meeting duration, or a meeting type or structure.

5. The system of claim 1, wherein the first lighting configuration and the second lighting configuration each comprise one or more of an activated light, a deactivated light, a brightness or intensity level, or a color spectrum, wherein the processor controls the first and second lighting configuration based on the information describing the local participant or context of the video communication session, and wherein the information describing the local participant or context of the video communication session is not based on active speaker detection or tracking.

6. The system of claim 1, wherein the first and second lighting configuration each comprise one or more of an activated light, a deactivated light, a brightness or intensity level, or a color spectrum, wherein the processor controls the first and second lighting configuration based on the information describing the local participant or context of the video communication session, and wherein the context is determining a point of local participant focus based on one or more of image processing or meeting content analysis.

7. A method for controlling lighting elements during a video communication session, comprising:
   selecting, by a processor, a lighting configuration to capture a first image by a camera for provision to a remote participant endpoint for display to another participant during the video communication session, wherein the selected lighting configuration is based, at least in part, on information describing a local participant or context of the video communication session, wherein the information describing the local participant or context of the video communication session is not based on active speaker detection or tracking, and wherein the first image is of a first set of objects and a second image is of a different second set of objects;
   providing, by the processor during the video communication session and to the remote participant endpoint, the second image captured under the selected lighting configuration;
   creating or updating, by the processor, an electronic map of a meeting area comprising the local participant, the electronic map comprising, for each lighting element, at least one of: a corresponding set of coordinates relative to a selected point of reference, a wattage level of a lighting element, a type of the lighting element, a color of light output by the lighting element, an intensity variability of the lighting element, a percentage of variation in intensity for different settings, a relationship of the lighting element to another lighting element, whether the lighting element is wirelessly controlled directly or indirectly by another lighting element, and an electronic address of the lighting element.

8. The method of claim 7, wherein the processor selects different lighting conditions for image capture at different points during a common video conferencing session, wherein the first image provided by the processor to the remote participant endpoint for display throughout a duration of the video communication session is captured by the camera, wherein the camera remains stationary while capturing the first and a second image, wherein the selected lighting conditions comprise one or more of the wattage level of the lighting element, the type of the lighting element, the color of light output by the lighting element, the intensity variability of the lighting element, or the percentage variation in intensity for different settings.

9. The method of claim 7, wherein a first and a second lighting configuration each comprise one or more of an activated light, a deactivated light, a brightness or intensity level, or a color spectrum, and further comprising:
   the processor controlling the first and second lighting configuration based on the information describing the local participant or context of the video communication session, and wherein the information describing the local participant or context of the video communication session comprises one or more of local participant locations based upon detection of a face of the local participant, an identity of the local participant, or a movement of the local participant from one location to another.

10. The method of claim 7, wherein a first and a second lighting configuration each comprise one or more of an activated light, a deactivated light, a brightness or intensity level, or a color spectrum, and further comprising:
   the processor controlling the first and second lighting configuration based on the information describing the local participant or context of the video communication session, wherein the information describing the local participant or context of the video communication session comprises one or more of a use of a key word or phrase during the video communication session, an estimated meeting duration, or a meeting type or structure.

11. The method of claim 7, wherein a first and a second lighting configuration each comprise one or more of an activated light, a deactivated light, a brightness or intensity level, or a color spectrum, and further comprising:
the processor controlling the first and second lighting configuration based on the information describing the local participant or context of the video communication session.

12. The method of claim 7, wherein a first and a second lighting configuration each comprise one or more of an activated light, a deactivated light, a brightness or intensity level, or a color spectrum, and further comprising:
the processor controlling the first and second lighting configuration based on the information describing the local participant or context of the video communication session, and wherein the context is determining a point of local participant focus based on one or more of image processing or meeting content analysis.

13. The method of claim 7, wherein the processor selects different lighting conditions for image capture at different points during a common video conferencing session, wherein the context is determining a point of local participant focus based on one or more of image processing or meeting content analysis and wherein a lighting controller selects each of a plurality of lighting elements and, for each of the plurality of lighting elements, determines one or more of a color of output light, an intensity of output light, or a brightness of output light.

14. A video-enabled communication system, comprising:
a processor coupled with a camera, wherein the processor causes the camera to acquire an image of a local participant in a meeting area during a video communication session; and
a computer readable medium comprising a lighting controller that causes the processor to select a set of lighting conditions for an image to be captured by the camera for provision to a remote endpoint for display to another participant, wherein the processor selects the set of lighting conditions by identifying one or more participant faces or facial features using face detection, varying alighting element property of one or more wirelessly controlled lighting elements until one or more detected face images is approximately equal to a target mean color for the one or more participant faces or facial features.

15. The system of claim 14, wherein the lighting controller causes the processor to discover one or more wirelessly controlled lighting elements in a meeting area and, by varying a state or setting of each of the discovered lighting elements and wherein the lighting controller causes the processor to create or update an electronic map of the meeting area, the electronic map comprising, for each lighting element, a corresponding one or more of a set of coordinates relative to a selected point of reference, a wattage level of the lighting element, a type of the lighting element, a color of light output by the lighting element, an intensity variability of the lighting element, when the lighting element has variable intensity, a percentage variation in intensity for different settings, a relationship of the lighting element to another lighting element, whether the lighting element is wirelessly controlled directly or indirectly by another lighting element, or an electronic address of the lighting element.

16. The system of claim 14, wherein the lighting controller causes the processor to discover one or more wirelessly controlled lighting elements in a meeting area and, by varying a state or setting of each of the discovered lighting elements and wherein the lighting controller determines, for the lighting element, one or more of a color of output light, an intensity of output light, or a brightness of output light.

17. The system of claim 14, wherein the lighting controller causes the processor to discover one or more wirelessly controlled lighting elements in a meeting area and, by varying a state or setting of each of the discovered lighting elements and wherein the lighting element has a wireless signaling interface, wherein the processor, using a first set of possible valid addresses on a network, pings each of the addresses in a first set of addresses, and, for each validated address, adds each of the validated addresses to a second set of valid addresses.

18. The system of claim 17, wherein the processor uses, for each address in the second set of valid addresses, one or more traceroute packets to determine a connectedness of a selected address to one or more addresses.

19. The system of claim 17, wherein the electronic map comprises the set of coordinates relative to the selected point of reference.

20. The method of claim 1, wherein the information describing the local participant or context of the video communication session comprises the use of the key word or phrase during the video communication session.

21. A method, comprising:
selecting, by a processor, a lighting configuration for a local participant to be captured by a camera for provision to a remote participant endpoint for display to another participant, the selected lighting configuration being based on information describing the local participant or context of a video communication session; and
conditioning, by the processor, a change from providing, to the remote participant endpoint for display, a first image captured under a first lighting configuration selected at a first time to a second image captured under a second lighting configuration selected at a second time upon a difference between the first and second times having at least a threshold magnitude.

22. The method of claim 21, wherein the processor conditions the change from providing, to the remote participant endpoint for display, the first image captured under the first lighting configuration selected at the first time to the second image captured under the second lighting configuration selected at the second time upon the difference between the first and second times having at least the threshold magnitude, wherein the first image is of a first set of objects and the second image is of a different second set of objects, wherein the image provided by the processor to the remote participant endpoint for display throughout a duration of the video communication session is captured by the camera, wherein the camera remains stationary while capturing the first and second images, wherein a lighting controller causes the processor to create or update an electronic map of a meeting area comprising the local participant, the electronic map comprising, for each lighting element, a corresponding one or more of a set of coordinates relative to a selected point of reference, a wattage level of the lighting element, a type of the lighting element, a color of light output by the lighting element, an intensity variability of the lighting element, when the lighting element has variable intensity, a percentage variation in intensity for different settings, a relationship of the lighting element to another lighting element, whether the lighting element is wirelessly controlled directly or indirectly by another lighting element, or an electronic address of the lighting element, and wherein the lighting controller selects each of a plurality of lighting elements and, for each of the plurality of lighting elements, determines one or more of a color of output light, an intensity of output light, or a brightness of output light.

23. The method of claim 21, wherein the first and second lighting configuration each comprise one or more of an activated light, a deactivated light, a brightness or intensity level, or a color spectrum, wherein the processor controls the first and second lighting configuration based on the information describing the local participant or context of the video communication session, and wherein the information describing the local participant or context of the video communication session comprises one or more of local participant locations based upon detection of a face of the local participant, an identity of the local participant, or movement of the local participant from one location to another.

24. The method of claim 21, wherein the first and second lighting configuration each comprise one or more of an activated light, a deactivated light, a brightness or intensity level, or a color spectrum, wherein the processor controls the first and second lighting configuration based on the information describing the local participant or context of the video communication session, and wherein the information describing the local participant or context of the video communication session comprises one or more of a use of a key word or phrase during the video communication session, an estimated meeting duration, or a meeting type or structure.

25. The system of claim 21, wherein the first and second lighting configuration each comprise one or more of an activated light, a deactivated light, a brightness or intensity level, or a color spectrum, wherein the processor controls the first and second lighting configuration based on the information describing the local participant or context of the video communication session, and wherein the information describing the local participant or context of the video communication session is not based on active speaker detection or tracking.

26. A system for controlling lighting elements during a video communication session, comprising:
 a processor;
 a computer readable medium, in communication with the processor, comprising instructions that cause the processor to:
 select a lighting configuration to capture a first image by a camera for provision to a remote participant endpoint for display to another participant during the video communication session, wherein the selected lighting configuration is based, at least in part, on information describing a local participant or context of the video communication session, wherein the information describing the local participant or context of the video communication session is not based on active speaker detection or tracking, and wherein the first image is of a first set of objects and a second image is of a different second set of objects;
 provide the video communication session and to the remote participant endpoint, the second image captured under the selected lighting configuration; and
 create or update, an electronic map of a meeting area comprising the local participant, the electronic map comprising, for each lighting element, at least one of: a corresponding set of coordinates relative to a selected point of reference, a wattage level of a lighting element, a type of the lighting element, a color of light output by the lighting element, an intensity variability of the lighting element, a percentage variation in intensity for different settings, a relationship of the lighting element to another lighting element, whether the lighting element is wirelessly controlled directly or indirectly by another lighting element, and an electronic address of the lighting element.

27. The system of claim 26, wherein the processor selects different lighting conditions for image capture at different points during a common video conferencing session, wherein the first image provided by the processor to the remote participant endpoint for display throughout a duration of the video communication session is captured by the camera, wherein the camera remains stationary while capturing the first and a second image, wherein the selected lighting conditions comprise one or more of the wattage level of the lighting element, the type of the lighting element, the color of light output by the lighting element, the intensity variability of the lighting element, or the percentage variation in intensity for different settings.

28. The method of claim 26, wherein a first and a second lighting configuration each comprise one or more of an activated light, a deactivated light, a brightness or intensity level, or a color spectrum, wherein the processor controls the first and second lighting configuration based on the information describing the local participant or context of the video communication session, and wherein the information describing the local participant or context of the video communication session comprises one or more of local participant locations based upon detection of a face of the local participant, an identity of the local participant, or a movement of the local participant from one location to another.

29. The method of claim 26, wherein a first and a second lighting configuration each comprise one or more of an activated light, a deactivated light, a brightness or intensity level, or a color spectrum, wherein the processor controls the first and second lighting configuration based on the information describing the local participant or context of the video communication session, wherein the information describing the local participant or context of the video communication session comprises one or more of a use of a key word or phrase during the video communication session, an estimated meeting duration, or a meeting type or structure.

30. The method of claim 26, wherein a first and a second lighting configuration each comprise one or more of an activated light, a deactivated light, a brightness or intensity level, or a color spectrum, and wherein the processor controls the first and second lighting configuration based on the information describing the local participant or context of the video communication session.

31. The method of claim 26, wherein a first and a second lighting configuration each comprise one or more of an activated light, a deactivated light, a brightness or intensity level, or a color spectrum, wherein the processor controls the first and second lighting configuration based on the information describing the local participant or context of the video communication session, and wherein the context is determining a point of local participant focus based on one or more of image processing or meeting content analysis.

32. The method of claim 26, wherein the processor selects different lighting conditions for image capture at different points during a common video conferencing session, wherein the context is determining a point of local participant focus based on one or more of image processing or meeting content analysis, and wherein a lighting controller selects each of a plurality of lighting elements and, for each of the plurality of lighting elements, determines one or more of a color of output light, an intensity of output light, or a brightness of output light.

33. A method, comprising:
acquiring, by a camera, an image of a local participant in a meeting area during a video communication session; and
selecting, by a processor, a set of lighting conditions for an image to be captured by the camera for provision to a remote endpoint for display to another participant, wherein the processor selects the set of lighting conditions by identifying one or more participant faces or facial features using face detection, varying a lighting element property of the one or more wirelessly controlled lighting elements until one or more detected face images is approximately equal to a target mean color for the one or more participant faces or facial features.

34. The method of claim 33, wherein the processor discovers one or more wirelessly controlled lighting elements in a meeting area and, by varying a state or setting of each of the discovered lighting elements and wherein the processor creates or updates an electronic map of the meeting area, the electronic map comprising, for each lighting element, a corresponding one or more of a set of coordinates relative to a selected point of reference, a wattage level of the lighting element, a type of the lighting element, a color of light output by the lighting element, an intensity variability of the lighting element, when the lighting element has variable intensity, a percentage variation in intensity for different settings, a relationship of the lighting element to another lighting element, whether the lighting element is wirelessly controlled directly or indirectly by another lighting element, or an electronic address of the lighting element.

35. The method of claim 33, wherein the processor discovers one or more wirelessly controlled lighting elements in a meeting area and, by varying a state or setting of each of the discovered lighting elements and wherein the processor determines, for the lighting element, one or more of a color of output light, an intensity of output light, or a brightness of output light.

36. The method of claim 33, wherein the processor discovers one or more wirelessly controlled lighting elements in a meeting area and, by varying a state or setting of each of the discovered lighting elements and wherein the lighting element has a wireless signaling interface, wherein the processor, using a first set of possible valid addresses on a network, pings each of the addresses in the first set of addresses, and, for each validated address, adds the valid address to a second set of valid addresses.

37. The method of claim 36, wherein the processor uses, for each address in the second set of valid addresses, one or more traceroute packets to determine a connectedness of a selected address to one or more addresses.

38. The method of claim 34, wherein the electronic map comprises the set of coordinates relative to the selected point of reference.

39. The method of claim 29, wherein the information describing the local participant or context of the video communication session comprises the use of the key word or phrase during the video communication session.

* * * * *

UNITED STATES PATENT AND TRADEMARK OFFICE
CERTIFICATE OF CORRECTION

PATENT NO. : 10,110,851 B2  
APPLICATION NO. : 15/148588  
DATED : October 23, 2018  
INVENTOR(S) : Amir Alrod and Tamar Barzuza Page 1 of 1

It is certified that error appears in the above-identified patent and that said Letters Patent is hereby corrected as shown below:

In the Claims

At Column 22, Line 28, after "a percentage" please delete the word "of" therein.

At Column 23, Line 47, please delete the word "alighting" and insert --a lighting-- therein.

At Column 24, Line 25, please delete "17" and insert --15-- therein.

At Column 24, Line 28, please delete "1" and insert --10-- therein.

At Column 27, Line 21, after "element property of" please delete "the" therein.

Signed and Sealed this  
Eleventh Day of December, 2018

Andrei Iancu  
*Director of the United States Patent and Trademark Office*